(12) United States Patent
Koenig

(10) Patent No.: US 8,650,246 B2
(45) Date of Patent: Feb. 11, 2014

(54) METHOD AND SYSTEM FOR LICENSING A SOFTWARE PRODUCT

(75) Inventor: Christoph Koenig, Ottobrunn (DE)

(73) Assignee: Fujitsu Technology Solutions Intellectual Property GmbH, Munich (DE)

( * ) Notice: Subject to any disclaimer, the term of this patent is extended or adjusted under 35 U.S.C. 154(b) by 632 days.

(21) Appl. No.: 12/608,308

(22) Filed: Oct. 29, 2009

(65) Prior Publication Data
US 2011/0106875 A1    May 5, 2011

(51) Int. Cl.
*G06F 15/16* (2006.01)
(52) U.S. Cl.
USPC .............................. 709/203; 726/26; 707/803
(58) Field of Classification Search
USPC .............................. 709/203; 726/26; 707/803
See application file for complete search history.

(56) References Cited

U.S. PATENT DOCUMENTS

| | | | |
|---|---|---|---|
| 6,108,420 A * | 8/2000 | Larose et al. | 705/59 |
| 6,389,538 B1 * | 5/2002 | Gruse et al. | 713/194 |
| 6,937,863 B1 | 8/2005 | Gordon et al. | |
| 7,836,122 B2 * | 11/2010 | Edwards et al. | 709/203 |
| 7,949,608 B2 * | 5/2011 | Li et al. | 705/59 |
| 2002/0107809 A1 * | 8/2002 | Biddle et al. | 705/59 |
| 2004/0103140 A1 * | 5/2004 | Huddleston et al. | 709/203 |
| 2005/0273436 A1 * | 12/2005 | Coley et al. | 705/59 |
| 2006/0059100 A1 * | 3/2006 | Ronning et al. | 705/59 |
| 2006/0059561 A1 * | 3/2006 | Ronning et al. | 726/26 |
| 2006/0089912 A1 * | 4/2006 | Spagna et al. | 705/51 |
| 2006/0106729 A1 * | 5/2006 | Roberts | 705/59 |
| 2006/0109768 A1 * | 5/2006 | Roberts, Jr. | 369/93 |
| 2006/0112019 A1 * | 5/2006 | Roberts | 705/59 |
| 2006/0143135 A1 * | 6/2006 | Tucker et al. | 705/59 |
| 2006/0212649 A1 * | 9/2006 | Roberts, Jr. | 711/112 |
| 2007/0238450 A1 * | 10/2007 | Hogberg | 455/418 |
| 2008/0091774 A1 * | 4/2008 | Taylor et al. | 709/203 |
| 2008/0201493 A1 * | 8/2008 | Richardson et al. | 710/15 |
| 2008/0320081 A1 * | 12/2008 | Shriver-Blake et al. | 709/205 |
| 2009/0172082 A1 * | 7/2009 | Sufuentes | 709/203 |
| 2009/0271324 A1 * | 10/2009 | Jandhyala et al. | 705/80 |
| 2010/0185686 A1 * | 7/2010 | Weigert et al. | 707/803 |
| 2010/0293622 A1 * | 11/2010 | Nikitin et al. | 726/31 |

FOREIGN PATENT DOCUMENTS

EP    0 538 464 B1    12/1998

* cited by examiner

*Primary Examiner* — Tauqir Hussain
(74) *Attorney, Agent, or Firm* — Slater & Matsil, L.L.P.

(57) ABSTRACT

A distributed method for licensing a software product is disclosed. Access to a software product by a user is requested at a client-side. An identity of the user and a local setting of the client-side are determined. At a server-side, licensing information specific to the determined local setting is selected from a licensing database. The selected licensing information is transmitted from the server-side to the client-side and then output at the client-side to the user. At the client-side, confirmation of a license agreement for the software product based on the output licensing information is requested.

20 Claims, 6 Drawing Sheets

METHOD AND SYSTEM FOR LICENSING A SOFTWARE PRODUCT

TECHNICAL FIELD

The present invention relates to a method and system for licensing a software product. In particular embodiments, the present invention relates to a method and system for licensing a software product in a networked environment.

BACKGROUND

Over the last couple of decades, the number of computers connected to data networks and the number of software products installed on any one computer system have increased significantly. At the same time, the number of providers for software products installed on a single computer has also increased. In particular, modern computer systems run a plurality of applications provided by a plurality of software vendors, which are usually installed after the purchase of the computer system by the user. Typically, a licensing contract between a user of a software product and the vendor of the software product must be agreed before installing the software. Such licensing agreements are typically specific to the software product licensed.

Managing licenses for software products is not only a problem for the user of a particular computer system but also for the vendor of the software product. Especially small to medium sized software vendors are faced with a significant challenge when they try to market and sell their software products over the Internet in an international environment. While providing the software itself over the Internet has become easy and widespread, providing license agreements that are in compliance with local laws and regulations remains difficult and often gives rise to legal uncertainty. In addition, charging the users for the use of a software product in a different country may also be cumbersome and unreliable.

Thus, especially small and medium sized software vendors often do not offer their software products in many countries or provide it with license agreements that are not in compliance with local laws and regulations. In either case, a loss of potential revenue and a potential for substantial damages arising from invalid license agreements are the consequence. However, obtaining specialized legal advice for all relevant countries often imposes high legal costs and effort that outweigh the potential benefits for small and medium sized software vendors. In consequence, competition between software vendors is biased towards larger corporations, which is undesirable.

So far, licensing systems have emphasized on enforcing license agreements. For example, U.S. Pat. No. 6,937,863 discloses a software licensing management system, in which usage of license software may be monitored in a computer system to determine if a use is within the scope of a license. More particularly, the system maintains a database of licenses for a software product, and stores a unit value indicating the number of licensed units for each product. This system is particularly useful for operators of medium to large data networks, where licenses can be centrally maintained at a license server. However, this system is unsuitable for small to medium sized software vendors providing only one or a few software products to individual users.

The present invention aims to address one or several of the above-mentioned problems. For this purpose, different methods, components and systems for licensing software products are disclosed herein.

SUMMARY OF THE INVENTION

According to one aspect of the invention, a distributed method for licensing a software product is provided. According to the method, access to a software product is requested by a user at a client-side. An identity of the user and a local setting of the client-side are determined. Then, at a server-side, licensing information specific to the determined local setting is selected from a licensing database. The selected licensing information is transmitted from the server-side to the client-side and then output at the client-side to the user. At the client-side, confirmation of a license agreement for the software product based on the output licensing information is requested. Optionally, at a server-side, contract information based on the identity of the user and the selected licensing information is stored upon reception of a confirmation signal from the user.

By selecting and transmitting licensing information from a server-side to a client-side at the time access to a software product is requested by a user, a license may be dynamically integrated into a software product at the time of installation or use. In this way, a dynamic license may be created, which is specific to a local setting of the requesting user. Such a license may be provided by a third party, especially an application service provider or a legal service provider, thus relieving the vendor of the software product from the task of providing a localized license agreement to the user.

According to a second aspect of the invention, a distributed licensing system for at least one software product accessible to at least one user is provided. The licensing system comprises a licensing database comprising a plurality of licensing information associated with the at least one software product, each licensing information specific to at least one local setting and a licensing module associated with the at least one software product. The licensing module is operative to determine the identity of a user and a local setting of a client-side, selecting licensing information for the software product specific to the determined local setting from the licensing database and to submit an offer to the user to enter a license agreement based on the selected licensing information.

Further aspects of the present invention relate to an application server capable of providing access to at least one software product to at least one user over a data network, a computer readable storage medium and a licensing module.

DETAILED DESCRIPTION OF PREFERRED EMBODIMENTS

The present invention and its advantages will be explained further using a number of exemplary embodiments with reference to the attached drawings. While several advantages and specific details of the various embodiments may be pointed out, the present invention shall not be restricted by the individual embodiments described below but only by the claims attached hereto.

Figure 1:
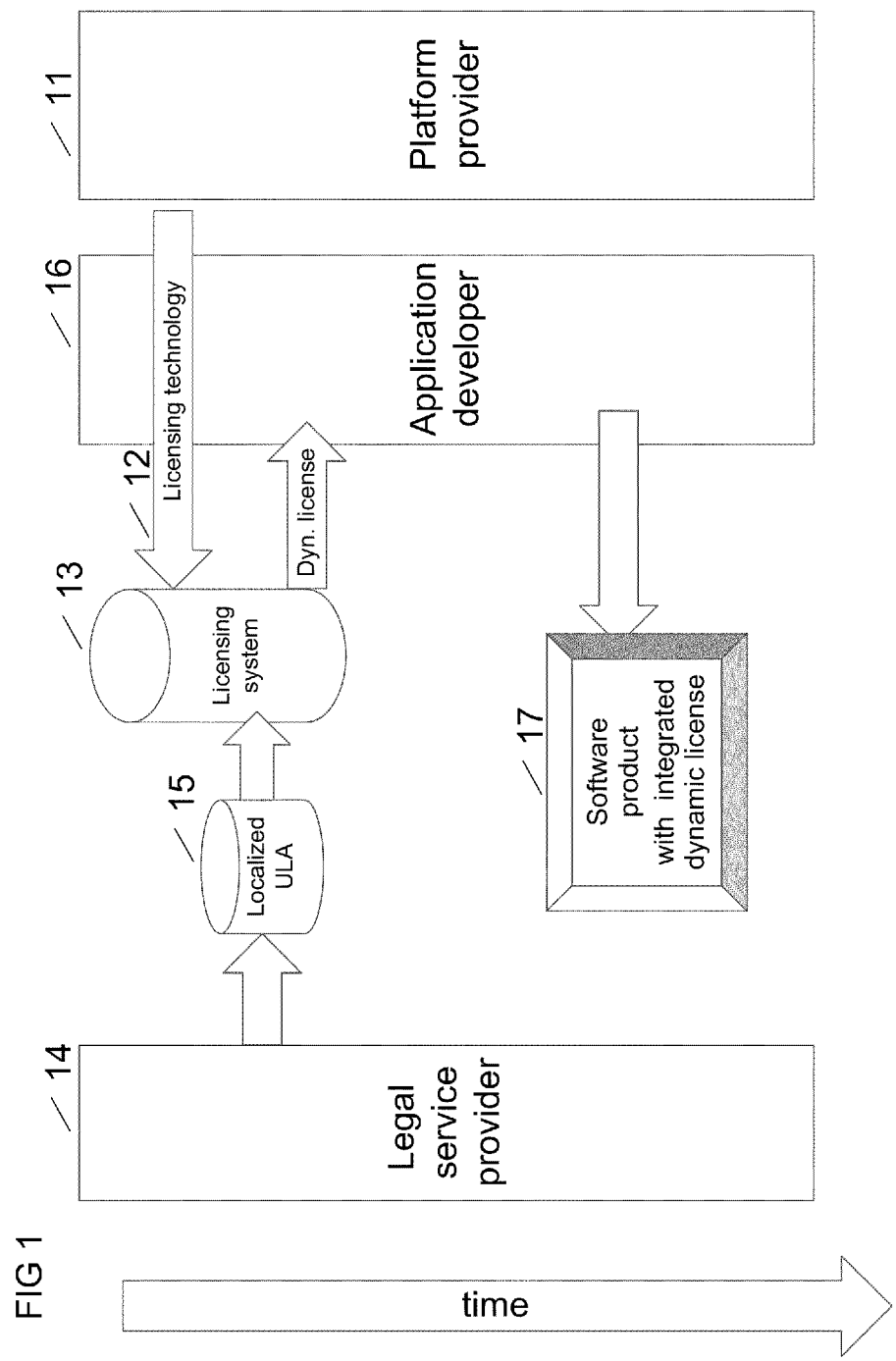
FIG. 1 shows a flow chart of a process for providing a software product.

FIG. 1 shows a process for developing a software product. In particular, the flow chart of FIG. 1 shows the time before the actual delivery of the software.

According to FIG. 1, three separate entities provide services in order to provide a product with an integrated dynamic license. In particular, a platform provider 11 provides a licensing technology 12 to a licensing system 13. The licensing technology 12 may comprise a licensing module 19 as described below, or merely an interface detailing a number of methods or procedures a software product using the licensing technology 12 may call upon. Furthermore, the licensing technology 12 may comprise further information, software products and tools that support a software vendor or application developer in integrating the described licensing system 13 into a particular software product 17.

Furthermore, a legal service provider 14 provides a plurality of so-called user license agreements (ULA) 15 for a software product 17. The user license agreements 15 provided by the legal service provider 14 are specific to at least one local setting. For example, one user license agreement 15 may be provided for each country in which the software product is offered based on a country code of the user. Optionally, different language versions of the user license agreement 15 may be available. For example, French and English language versions of a user license agreement 15 for Canadian users may be provided. Furthermore, different types of user license agreements 15 may be provided, for example, individual licenses, multi-user licenses or site-licenses. The user license agreements 15 may provide different pricing models such as a pay-upfront flat payment, an annual payment or a pay-per-use payment scheme for the associated software product 17. However, the user license agreements 15 can be used for a plurality of software products 17. For example, a single license agreement 15 may be used for different software products from different software vendors for a single target market, like the United States of America.

During the development of the software product 17, an application developer 16 integrates the licensing technology 12 into the software product 17. For example, a licensing module 19 may be included into the software product 17 by means of a binding mechanism. Alternatively, a remote method call to the licensing system 13 provided by a platform provider 11 may be included in the developed software product 17. In this way, both the content and the processing of the data related to a user license agreement 15 do not need to be considered during application development by the application developer 16.

However, the application developer 16 might restrict a developed software product 17 to a subset or part of the functionality provided by the licensing system 13. For example, the application developer 16 may decide to provide his software product 17 only on a pay-per-use basis, or only under a pay-up-front licensing scheme.

When the development process of the software product 17 is completed, the software product 17 with the integrated dynamic licensing technology 12 can be released by the application developer 16. For example, the software product 17 may be offered on the website of the application developer 16 for download or may be delivered to the platform provider 11 for hosting. The released software product 17 comprises the necessary technical features in order to establish a valid license agreement 15 specific to a local setting of a prospective user of the software product 17 at a later stage.

Figure 2:
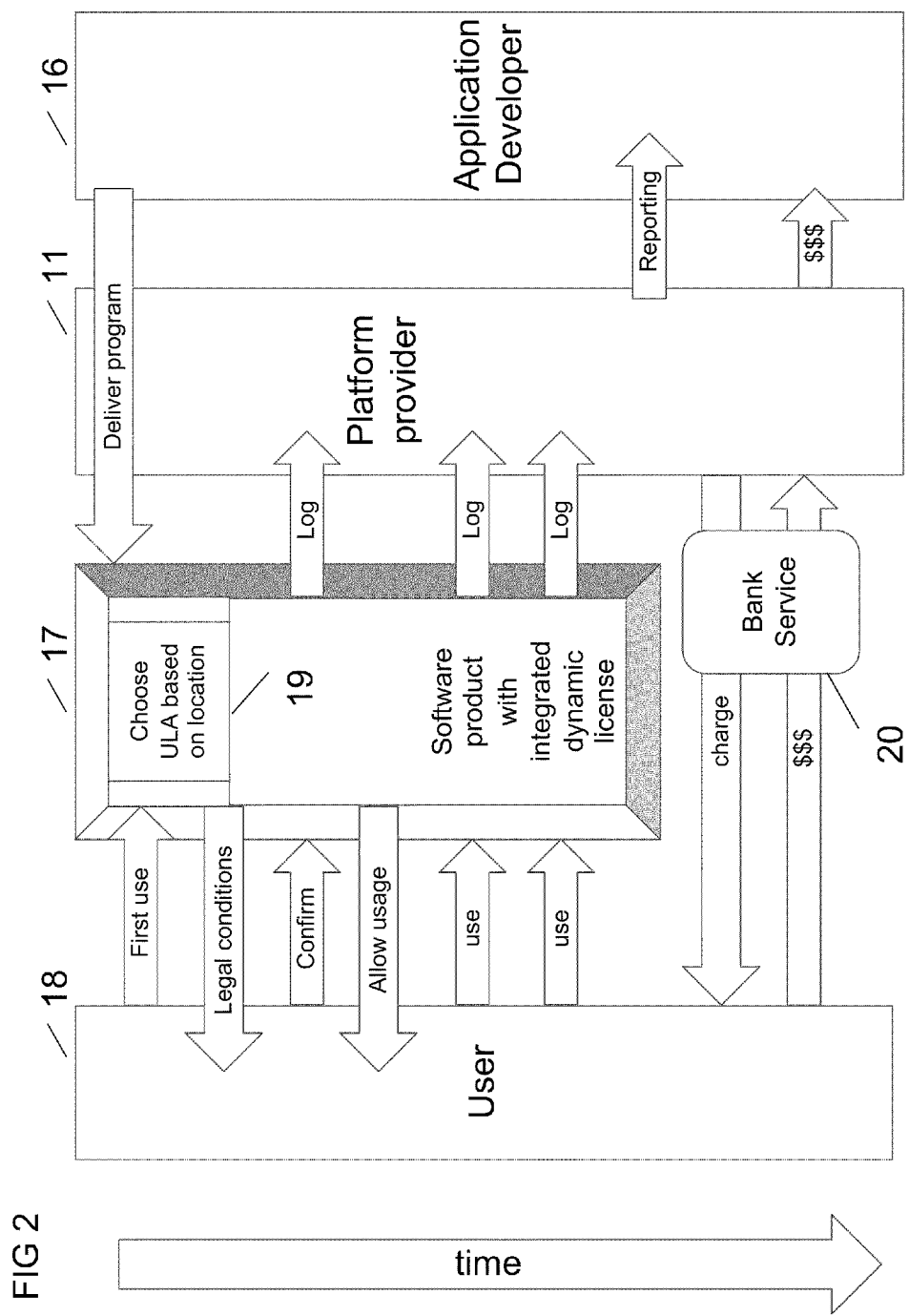
FIG. 2 shows a flow chart of a process for licensing a software product.

FIG. 2 shows a flow chart of a process starting with the delivery of the software product 17. As explained above, the application developer 16 may deliver the completed software product 17 either to a user 18 or to a platform provider 11. Upon first use of the software product 17, a valid user license agreement 15 is selected by the licensing module 19 based on the local setting of the user 18.

The local setting may comprise the country or jurisdiction of the user 18. In addition or alternatively, the local setting may comprise a language setting of the user 18. The information may be determined automatically, for example, by analyzing the system environment of a user computer, or may be provided explicitly by the user using, for example, a multiple choice selection field of a user interface.

Optionally, the correctness of the information provided by the user may be verified. For example, the local setting may be verified against a database containing personal information about an identified user. In particular in the case where the software product is hosted by the platform provider 11, the user 18 will usually provide log-in information, for example, a user-ID and an associated password, before using the software product 17. This information may be used not only to determine the identity of the user 18 but also to determine the local setting associated with the user 18.

The licensing module 19 associated with the software product 17 will then select appropriate licensing information which is both valid and intelligible for the user 18. These legal conditions are provided to the user 18 over a data network, in particular, the Internet, and output at a client-side. For example, the legal conditions of the user license agreement 15 may be displayed on the screen of a user computer or printed out at a printer at the client-side.

In a subsequent step, the user 18 confirms his or her user license agreement 15 with the provided licensing information. Preferably, the confirmation signal provided by the user 18 is also provided over the data network. However, other methods of providing confirmation signals from a user back to the licensing module 19 may be used. For example, the user 18 may call a call center operated by the platform provider 11 or application developer 16. Only after confirming the user license agreement 15, the licensing module 19 allows the user 18 to use the requested software product 17.

The user license agreement 15 selected by the licensing module 19 and confirmed by the user 18 or a reference thereto is then stored in a contracting database. Preferably, the contract information is stored by the platform provider 11.

Depending on the conditions of the agreed user license agreement 15, the usage of the software product 17 may be reported to the licensing module 19. For example, if the software product 17 is executed on a client computer of the user 18, frequency and duration of the use of the locally installed software product 17 may be reported to a licensing server. Alternatively, when the software product 17 is installed on an application service provider, the number of log-ins and the duration of the sessions of a user 18 with the application service provider may be logged and provided to the licensing module 19.

Based on the stored usage information and the details of the contract, the platform provider 11 may optionally generate an invoice for charging the user 18 for the use of the software product 17. The invoice may be provided to the user 18 directly or to an intermediate financial service provider 20, for example, a bank or a credit card company which may charge the user 18 on behalf of the platform provider 11. Payment is then transferred from the user 18 to the platform provider 11. The platform provider 11 calculates the application developer's share of the received revenue and transfers it to the application developer 16 in accordance with a legal agreement between the platform provider 11 and the application developer 16.

Figure 3:
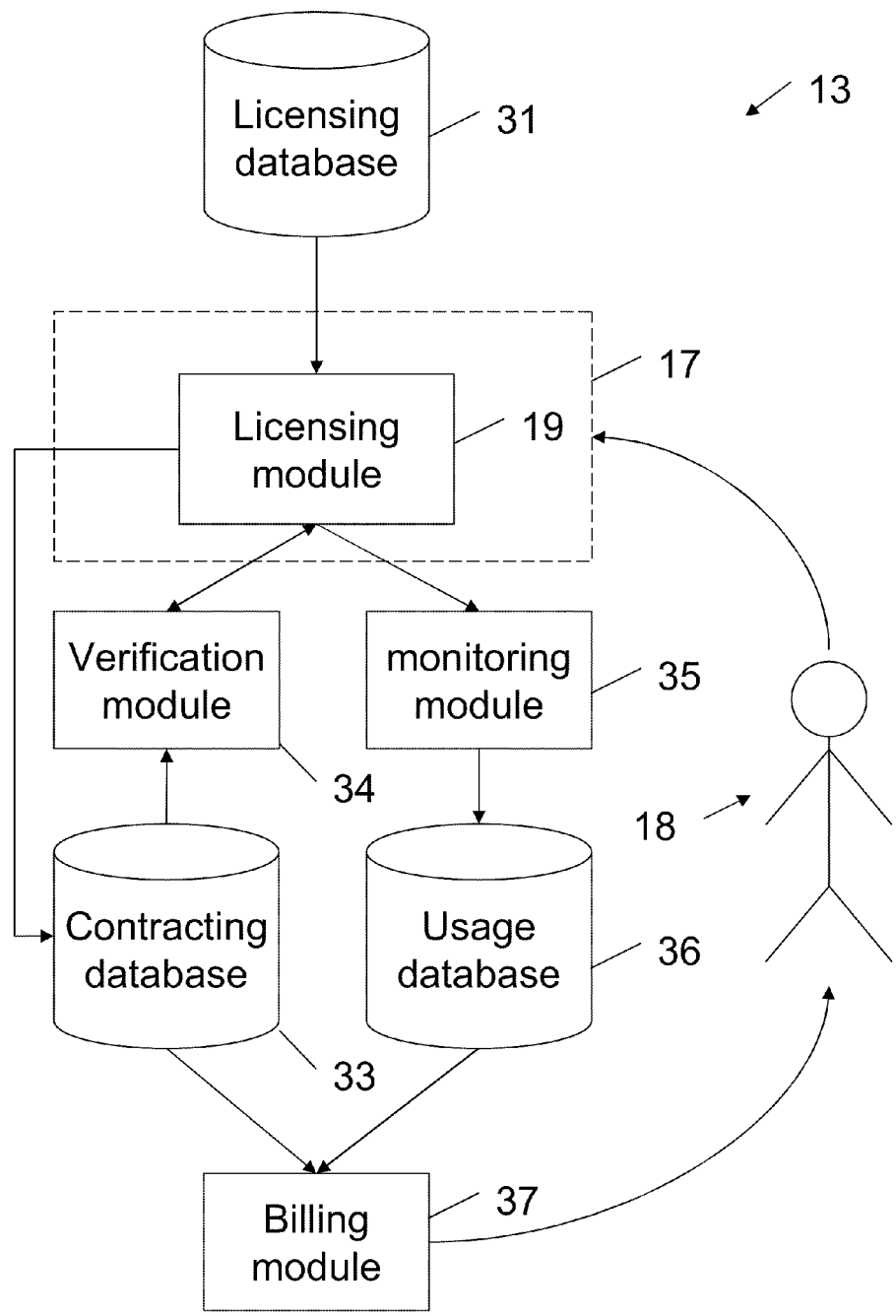
FIG. 3 shows a schematic diagram of a system for licensing a software product.

FIG. 3 shows a schematic diagram of the licensing system 13. The licensing system 13 comprises a licensing database 31 and a licensing module 19.

The licensing module 19 may be embedded in a software product 17. Alternatively, the licensing module 19 may be provided independently of the software product 17. The licensing database 31 comprises a plurality of licensing information. Each set of licensing information is specific to at least one local setting associated with a user 18. A user 18 may be any legal entity capable of entering a license agreement. For example, a user 18 may correspond to an individual person, a group of people or a legal entity such as a company.

It is one responsibility of the licensing module 19 to enforce that a user license agreement 15 between the user 18 and the vendor of the software product 17 or platform provider 11 providing access to the software product 17 exists. For this purpose, the licensing module 19 determines the identity of the user 18 requesting access to the software product 17. Furthermore, the licensing module 19 establishes at least one local setting associated with the user 18 or a client computer used to access the software product 17. According to the described embodiment, the local setting is established whenever a new user license agreement 15 is created, or an existing user license agreement needs to be updated. However, in other embodiments, the local setting may be established at predetermined intervals or when the identity of the user 18 is determined. If no valid license for the user 18 exists, the licensing module 19 selects appropriate licensing information from the licensing database 31. In particular, the licensing module 19 queries the licensing database 31 for a set of licensing information associated with the at least one local setting of the user 18.

Once a valid license agreement 15 between the user 18 and the service provider has been entered, the licensing module 19 stores contract information in a contracting database 33. For example, an identity of the user 18, the terms of the user license agreement 15 entered, the date the license agreement 15 was entered and, optionally, pricing information agreed may be stored in the contracting database 33.

If the user 18 tries to access the software product 17 later again, the licensing module 19 will determine that a valid user license agreement 15 for the user 18 exists. For this purpose, a verification module 34, which may be part of the licensing module 19 or may be accessible by the licensing module 19, verifies user credentials provided by the user 18 with information stored in the contracting database 33.

In addition, the verification module 34 may optionally verify that the terms of the user license agreement 15 stored in the contracting database 33 are still valid. For example, the verification module 34 may compare the licensing information stored in the contracting database 33 with current licensing information stored in the licensing database 31. If the verification module 34 determines that the licensing information stored for the user 18 in the contracting database 33 is no longer in compliance with legal requirements, for example, because of a change of the legal situation at the user location necessitating a new licensing agreement, the verification module 34 will inform the licensing module 19 that no valid user license agreement 15 exists. In this case, the licensing module 19 will offer the user 18 to enter a new license agreement based on updated licensing information retrieved from the licensing database 31 as described above. Similarly, pricing information may be changed regularly for licensing models based on a pay-per-use scheme in this way. In this case, the user 18 is informed about and agrees to the new pricing structure when he activates the software product 17 after such a change.

If the user 18 is licensed to use the software product 17 and the user license agreement 15 of the user 18 is still valid, a monitoring module 35 may be activated in order to store usage information in a usage database 36. For example, the licensing module 19 may notify the monitoring module 35 every time the user 18 starts the software product 17. Alternatively or in addition, the monitoring module 35 may be notified about and store the amount of time, the volume of data processed or any other measure related to the usage of the software product 17 agreed in the user license agreement 15 with the user 18.

As a further optional component, a billing module 37 may be used to invoice the user 18 based on the information stored in the usage database 36 and the optional pricing information stored in the contracting database 33. For example, the billing module 37 may retrieve the number of accesses to the software product 17 by the user 18 within a given billing period, for example, a calendar month. This information may then be compared with the number of accesses allowed under a user license agreement 15 stored in the contracting database 33. Based on the information retrieved by the billing module 37, the user 18 may be charged a fixed amount or an amount agreed per usage of the software product 17.

In an alternative embodiment, the license agreement 15 may be stored at the user side only. In this case, a communication with a licensing server is established only once or only upon specific request from the user 18 to obtain a new license agreement 15. Such an embodiment is suitable for licensing systems 13 in which a one-off payment is affected and verified immediately and in which the platform provider 11 does not require evidence of information of the license agreement 15 entered after the time of licensing the software product 17.

Figure 4:
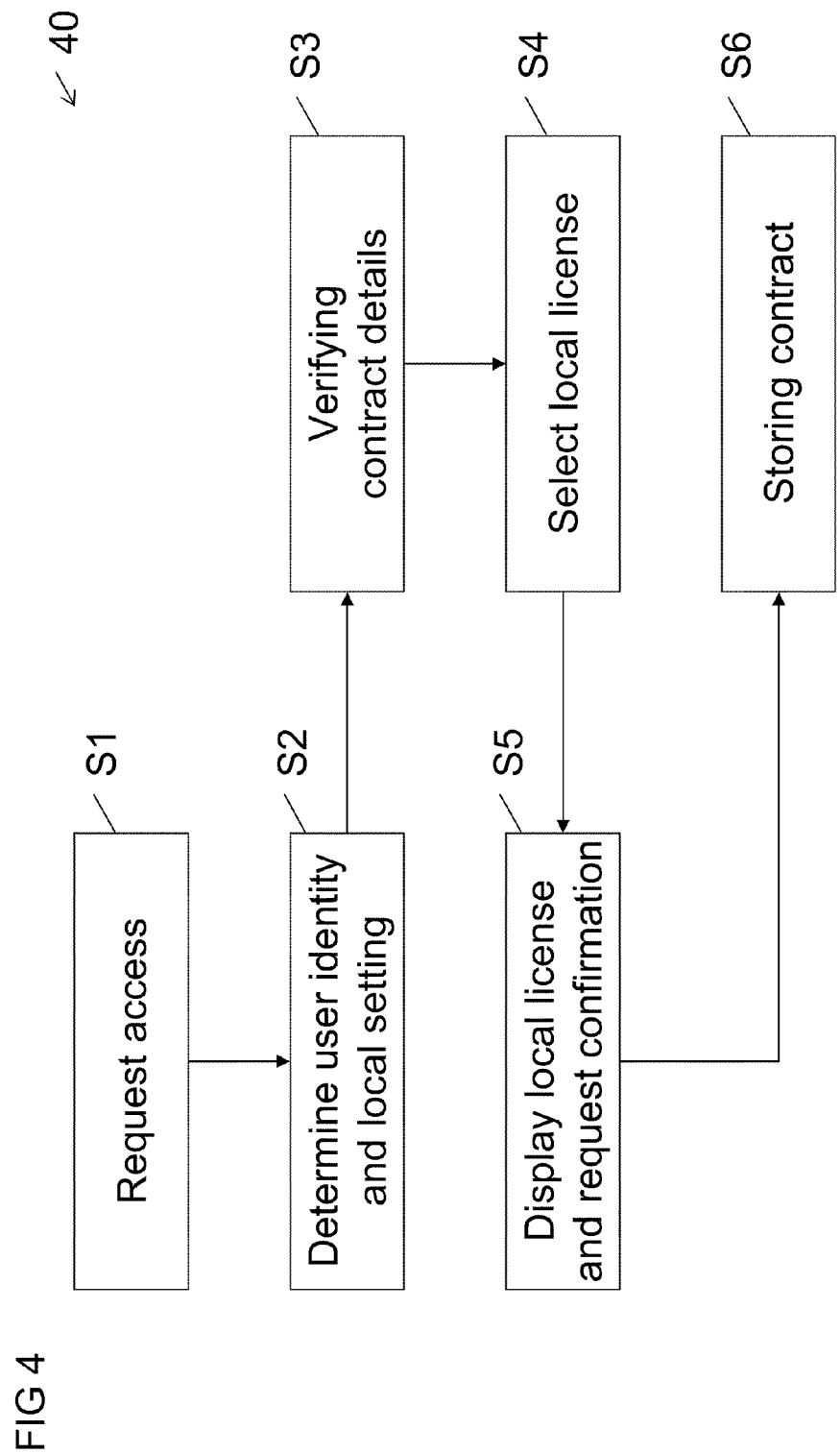
FIG. 4 shows a flow chart of a method for licensing a software product.

FIG. 4 shows a flow chart of a method for licensing a software product. In the embodiment described, the steps S1, S2 and S5 shown on the left-hand side of FIG. 4 are performed at the client-side of a distributed licensing system 13. The method steps S3, S4 and S6 shown on the right-hand side of FIG. 4 are performed at the server-side of the distributed licensing system 13.

In step S1, a user 18 requests access to a particular software product 17. The software product 17 may be any software application, database, media stream or any other digital resource that may be subject to a license agreement. The access request of step S1 may be a local request, like the starting or the installation of a software product on a local machine of the user 18 or may be a remote access, such as the log-in of the user 18 into a remote server computer, for example, a portal of an application service provider on the Internet.

In step S2, the user identity and a local setting of the user 18 are determined. For example, authentication credentials of the user 18 may be obtained by a client system of the user 18. For this purpose, the user 18 may enter a user-ID and a user password to a client system. Alternative, other methods of authentication like providing a chip card with an electronic signature such as an electronic identity card, a fingerprint or other means of identifying the user 18 may be used. The local setting may be determined based upon the identity of the user 18, for example, a nationality or home location of the user 18 stored with the user identity. Alternatively, for example, in cases where such information are not available or the user identity is associated with multiple local settings such as a legal entity having a local presence in different countries, it may be determined based on a system setting of the client system used to access the software product 17. Also, the user 18 may manually enter the local setting. The determined information is then transferred to the server-side of the distributed licensing system.

In step S3, the licensing module 19 of a licensing system 13 verifies the determined user identity and, optionally, the local setting associated with the access request. In particular, the licensing module 19 may call the verification module 34 in order to query the contracting database 33. If valid licensing information associated with the user identity are stored in the contracting database 33, the requested access to the software product 17 is allowed. Optionally, the verification module 34 may verify if the licensing information stored in the contracting database 33 are valid for the determined local setting.

If no valid licensing information is stored in the contracting database 33, in a subsequent step S4, the licensing system 13 selects appropriate licensing information for the identified user 18. The selected licensing information will be based on the local setting of the user 18 and also on the current legal constraints associated with this local setting. The selected licensing information is then transmitted to the client-side of the licensing system 13.

In a step S5, the selected licensing information is displayed at the client-side. For example, a dialog window of the software product 17 may be opened showing the licensing information relevant to the identified local setting. The user 18 is then offered the opportunity to enter a user license agreement 15 by confirming the licensing information displayed in the window or to abandon the access request.

Upon confirmation of the offered user license agreement 15 by the user 18, a confirmation signal is transferred from the client-side to the server-side. In a step S6, the licensing module 19 then stores contract information related to the licensing information provided, the user identified in step S2 and the resource requested in step S1 in the contracting database 33. Optionally, further information like the local setting, the date and time the agreement was entered, a network address of the requesting client, information about agreed license payments, in particular, a billing address or credit card number, may be stored. In addition, a provider of the software product 17 may be informed about the entered license agreement 15.

Figure 5:
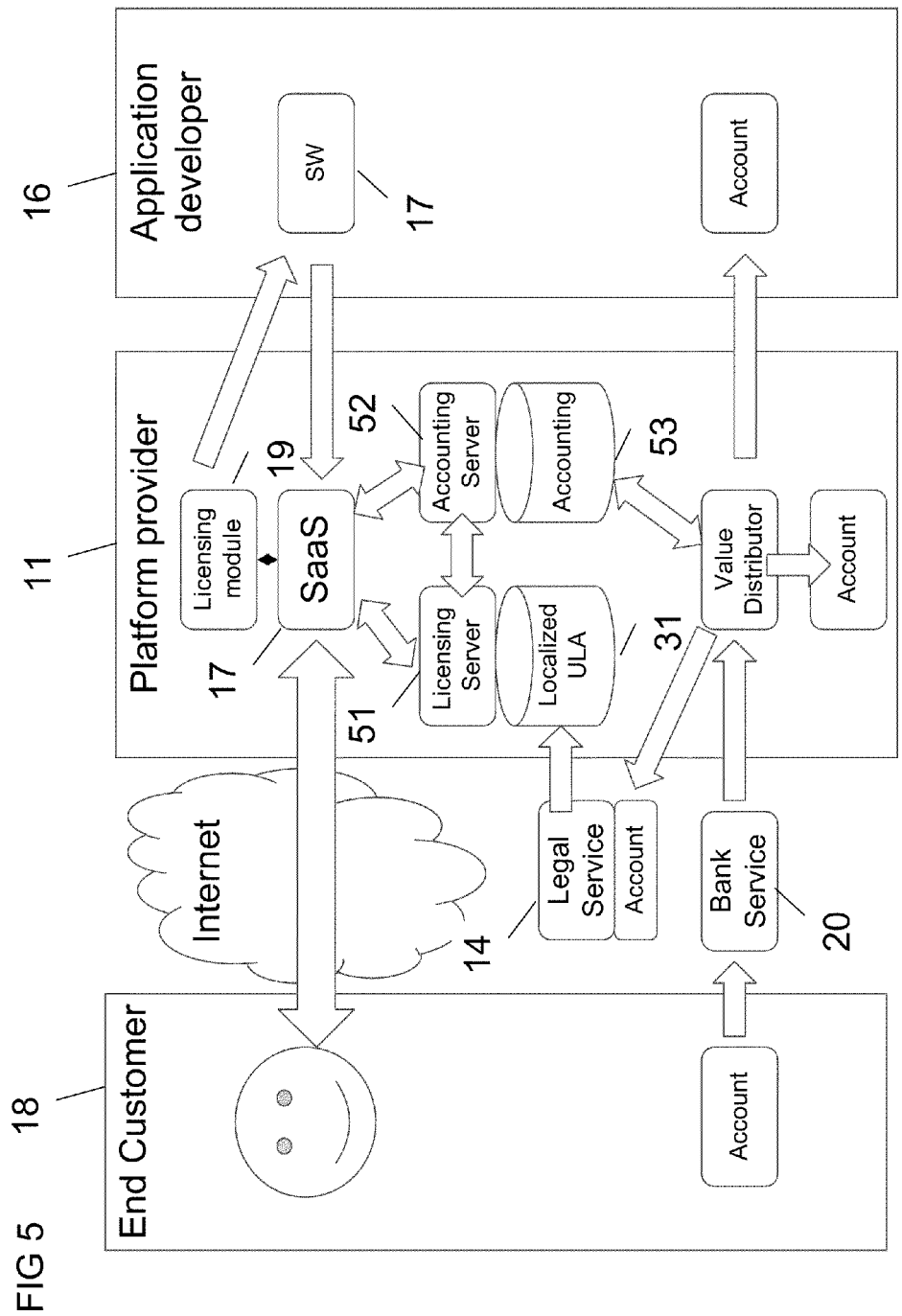
FIG. 5 shows a first scenario for licensing a software product hosted by an application service provider.

FIG. 5 shows a first scenario of how the different components of the licensing system 13 may be distributed. It relates to a scenario which is sometimes referred to as "cloud computing", in which different functional units are distributed over a "cloud" of host computers on the Internet.

In this scenario, the software product 17 requested by the user 18 is not installed locally on a client computer of the user 18. Instead, the software product 17 is provided as a "Software as a Service" (SaaS). For example, an Internet service provider or an application service provider providing software products in a specific area of computing services may offer the user 18 access to the SaaS software product 17 over the Internet.

Preferably, the platform provider 11 may also provide the licensing module 19 associated with the software product 17. However, the licensing module 19 may also be provided by a different developer or service provider. The application developer 16 integrates the licensing module 19 into the software product 17 and provides the encapsulated software product 17 to the platform provider 11. The platform provider 11 then provides the necessary resources, e.g., hardware, network and/or other software components, for executing the software product 17. The software product 17 relies on the licensing module 19 in order to establish a connection with a licensing server 51 and verify a license agreement between the user 18 and the platform provider 11. For this purpose, a licensing database 31 comprises a plurality of localized licensing information provided by a legal service provider 14 as described above.

The platform provider 11 may also provide an accounting server 52. The accounting server 52 monitors the usage of the software product 17 by each of the users 18 of the platform provider 11. Based on the usage of the software product 17 and the user license agreement 15 associated with the user, usage and billing information are stored in an accounting database 53, comprising, for example, the contracting database 33 and the usage database 36 described above with respect to FIG. 3.

It should be noted that in this scenario, the platform provider 11 provides not only the necessary resources to run the software product 17 for a plurality of users 18, but also provides licensing technology 12 to the application developer 16 and acts as an intermediate agent between the user 18 and the application developer 16. In particular, the user 18 will typically enter into a user license agreement 15 with the platform provider 11 rather than with the application developer 16. Consequently, a second agreement will be entered between the platform provider 11 and the application developer 16, which specifies their terms of contract for hosting and providing the software product 17, respectively.

Accordingly, a value flow shown in the lower part of FIG. 5 corresponds to this two-tier architecture. Payments from the user 18 are transferred from his or her account via a financial service provider 20 to the platform provider 11. The platform provider 11 then distributes the received value flow to the legal service provider 14 for providing the localized licensing information, the application developer 16 for providing the software product 17 and himself for providing the hosting services.

Figure 6:
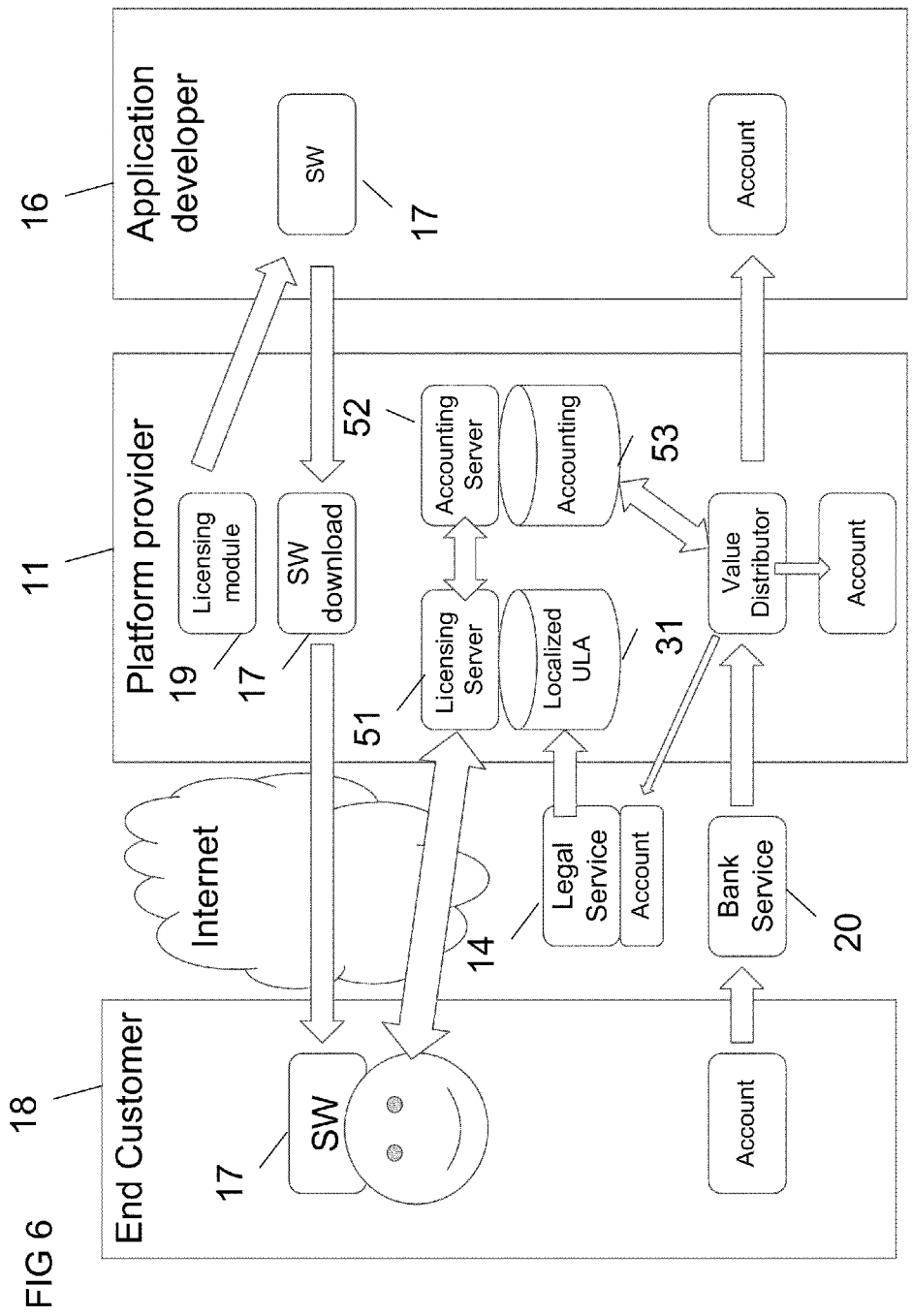
FIG. 6 shows a second scenario for licensing a software product installed on a user computer.

FIG. 6 shows an alternative scenario for licensing a software product 17 using a distributed licensing system 13. In this scenario, the software product 17 is installed locally on a client computer of the user 18.

Similar to the scenario described above, a platform provider 11 provides a licensing module 19 to an application developer 16. The application developer 16 then integrates his or her software product 17 with the provided licensing module 19. The completed software product 17 is encapsulated and provided for download by the platform provider 11. The user 18 may access the platform provider 11 via the Internet and download the selected software product 17.

Upon download, installation or first execution of the software product 17, the user 18 is required to access the licensing server 51 of the platform provider 11. The licensing server 51 of the platform provider 11 then selects licensing information based on a local setting of the user 18. Only upon confirmation of a user license agreement 15 based on the selected license information through the user 18, the execution of the software product 17 on the user computer is allowed.

In case a per-use license agreement is entered between the user 18 and a platform provider 11, the software product 17 will provide the licensing server 51 of the platform provider 11 with additional usage data. An accounting server 52 of the platform provider 11 will monitor the usage data and store suitable usage information in an accounting database 53 based on the license agreement entered into by the user 18. In addition, a billing service provided by the platform provider 11 will charge the user 18 for the incurred costs.

As described above, the platform provider 11 may serve as an intermediate party in the value distribution process. In the shown scenario, payments made by the user 18 under the user license agreement 15 through a financial service provider 20 are paid to the platform provider 11. The platform provider 11 then distributes the incoming value flow between the legal service provider 14, the application developer 16, and himself. Of course, this or any other functionality may also be provided by any of the other entities or a third party operator. For example, the application developer 16 or the financial service provider 20 may act as a distributor for the value flow.

The described licensing methods and systems provide a number of advantages over the licensing systems known in the art. One of the advantages of the described systems and methods is that the processes of application development and provision of localized licensing information are separated. Furthermore, the licensing information required to enter a valid license agreement can be provided based on a local setting of a user at a time the user actually accesses the software product, i.e., on demand. Thus, only the most up-to-date licensing information is used for entering a user license agreement.

Furthermore, if any information relevant to the entered license agreement changes, for example, the legal situation or the pricing structure, the user may be requested to enter a new, valid license agreement. However, care should be taken not to forward any change of licensing information in a licensing database to all users. In particular, only such updates in the licensing information should result in the offer for a new licensing agreement if the change in licensing information would make a present user license agreement invalid. Thus, the provider of the licensing information, like the legal service provider, should specify whether updated licensing information should affect all contracts associated with a specific software product or only new license agreements.

A particular advantage of the approach presented above is that the location-specific license information may be used for a plurality of software products. In this way, considerable effort spent on devising localized license information may be shared by a plurality of small or medium-sized application developers or software products.

What is claimed is:

1. A distributed method for licensing an executable software product, the method comprising:
   receiving a request from a client-side to access to a software product by a user;
   determining an identity of the user and a local setting of the client-side;
   selecting, at a server-side, licensing information specific for the determined locale setting from a licensing database;
   transmitting, from the server-side to the client-side, the selected licensing information so that the transmitted licensing information can be output to the user; and
   receiving a request from the client-side for confirmation of a license agreement for the software product based on the output licensing information;
   selecting, at the server-side, stored contract information based on the requested access to the software product and the determined identity of the user;
   verifying selected contract information associated with the software product;
   executing the requested software product for the user upon successful verification of the contract information;
   storing, at the server-side, usage information related to a use of the executed software product by the user; and
   invoicing the user based on stored contract information and stored usage information,
   wherein the determining an identity, selecting licensing information, transmitting the selected licensing information, outputting licensing information and receiving a request for confirmation are performed upon activation of a licensing module integrated with the software product; and
   wherein the software product and the integrated licensing module are executed at the server-side and the integrated licensing module receives credentials of the user and the local setting from the client-side and transmits the selected licensing information to the client-side.

2. The method of claim 1, wherein the locale setting comprises data related to at least one of a country setting and language setting.

3. The method of claim 1, wherein the licensing information comprises data related to at least one of a user license agreement and pricing information.

4. The method of claim 1, further comprising:
   storing, at the server-side, contract information based on the identity of the user and the selected licensing information upon reception of a confirmation signal from the user.

5. The method of claim 4, wherein the contract information comprise data related to at least one of personal information of a legal entity associated with the user, date and/or time the license agreement was entered and the selected licensing information.

6. The method of claim 1, wherein the integrated licensing module is activated when a request for access to the software product for the user is received for a first time by an application server at the server-side.

7. The method of claim 1, wherein the integrated licensing module is activated repetitively.

8. The method of claim 7, wherein the activation of the integrated licensing module is repeated if contracting information stored at the server-side is invalidated.

9. A distributed licensing system for at least one executable software product accessible to at least one user, the system comprising:
   a host computer at a server-side;
   a licensing database comprising a plurality of licensing information associated with the at least one executable software product, each licensing information specific to at least one locale setting; and
   a licensing module integrated with the at least one executable software product, the integrated licensing module operative to determine an identity of a user of a client computer and a locale setting of the client computer, select licensing information for the at least one executable software product specific to a determined locale setting from the licensing database and submit an offer to the user to enter a license agreement based on selected licensing information;
   wherein the at least one executable software product and the integrated licensing module are executed on the host-computer at the server-side and the integrated licensing module receives credentials of the user and the local setting from the client-computer at the client-side and transmits the selected licensing information to the client computer at the client-side,
   wherein the distributed licensing system is configured to:
      select, at the server-side, stored contract information based on a requested access to the software product and the determined identity of the user,
      verify selected contract information associated with the software product,
      execute the requested software product for the user upon successful verification of the contract information, store in a memory, at the server-side, usage information related to a use of the executed software product by the user, and invoice the user based on stored contract information and stored usage information.

10. The licensing system of claim 9, further comprising:

a contracting database comprising a plurality of contract information, each contracting information specific to the at least one user, the at least one executable software product and a licensing information from the licensing database; and a verification module operative to verify a request for executing the at least one executable software product by an identified user based on the contract information stored in the contracting database.

11. The licensing system of claim 10, further comprising:

a usage database comprising usage information, a monitoring module operative to collect usage data for the at least one executable software product and to store usage information based on the collected usage data for the at least one executable software product and the at least one user in the usage database; and a billing module operative to invoice the at least one user based on the contract information of the contracting database and the usage information of the usage database.

12. An application server, comprising:

at least one host computer adapted to execute at least one software product of a plurality of software products accessible to at least one user at a user computer over a data network;

a licensing module integrated with the at least one software product, the integrated licensing module operative to determine an identity and a locale setting of the user, determine, upon access by the at least one user, whether valid contract information relating to a valid license agreement for the identified user to use the at least one software product exists and request the user to enter a license agreement based on a determined locale setting of the user, if it determines that no valid contract information for the identified user to use the at least one software product exists;

wherein the application server provides access to the plurality of software products over the data network and licensing information stored in a licensing database is used to license the plurality of software products, and wherein the application server is configured to:

select, at the server-side, stored contract information based on a requested access to the software product and the determined identity of the user, verify selected contract information associated with the software product, execute the requested software product for the user upon successful verification of the contract information, store in a memory, at the server-side, usage information related to a use of the executed software product by the user, and invoice the user based on stored contract information and stored usage information.

13. The application server of claim 12, wherein the integrated licensing module is operative to execute the at least one software product for the identified user, if contract information relating to a valid license agreement for the identified user to use the at least one software product exists.

14. The application server of claim 12, wherein the integrated licensing module is operative to connect to a contracting database for querying contract information to determine whether valid contract information relating to a valid license agreement for the identified user to use the at least one software product exists.

15. The application server of claim 12, wherein the integrated licensing module is operative to connect to a licensing database for requesting licensing information for the software product specific to the locale setting, if it determines that no valid contract information for the identified user to use the at least one software product exists.

16. The application server of claim 12, wherein the integrated licensing module is further adapted to provide usage data and the determined identity of the user to a monitoring module.

17. A non-transitory computer-readable storage medium which stores a set of executable instructions which, when executed on a host computer at a server-side, performs a method for licensing a software product including an integrated licensing module, the method comprising:

determining an identity of a user and a local setting of a client computer at a client-side;

selecting licensing information specific for a determined locale setting from a licensing database;

transmitting, from the server-side to the client-side, the selected licensing information for outputting the transmitted licensing information to the user;

requesting confirmation of a license agreement for the software product based on the output licensing information from the client computer, wherein the determining an identity, selecting licensing information, transmitting the selected licensing information and requesting confirmation are performed upon activation of the integrated licensing module;

selecting, at the server-side, stored contract information based on a requested access to the software product and the determined identity of the user;

verifying selected contract information associated with the software product;

executing the requested software product for the user upon successful verification of the contract information;

storing in a memory, at the server-side, usage information related to a use of the executed software product by the user; and invoicing the user based on stored contract information and stored usage information.

18. The computer-readable storage medium of claim 17, wherein the method for licensing the software product further comprises:

storing contract information based on the identity of the user and the selected licensing information upon reception of a confirmation signal from the user.

19. A non-transitory computer-readable storage medium with an executable program stored thereon, the executable program comprising:

an integrated licensing module for dynamically licensing an executable software product over a data network that comprises at least one client computer at a client-side and at least one host computer at a server-side, the integrated licensing module being operative to determine an identity of a user and a locale setting of a client-side, select licensing information for the software product specific to the determined locale setting from a licensing database and submit an offer to the user to enter a license agreement based on the selected licensing information upon activation of the integrated licensing module by the software product; and wherein the integrated licensing module is operative to be executed at the server-side and to receive credentials of the user and the local setting from the client computer and to transmit the selected licensing information to the client computer, wherein upon execution the executable program is configured to perform a method comprising:

selecting, at the server-side, stored contract information based on a requested access to the software product and the determined identity of the user, verifying selected contract information associated with the software product, executing the requested software product for the user upon successful verification of the contract information, storing in a memory, at the server-side, usage information related to a use of the executed software product by the user, and invoicing the user based on stored contract information and stored usage information.

20. The method of claim 1, further comprising outputting, at the client-side, the transmitted licensing information to the user.

* * * * *